United States Patent
Gao et al.

(10) Patent No.: US 9,235,231 B2
(45) Date of Patent: Jan. 12, 2016

(54) WORKPIECE SEPARATING DEVICE

(71) Applicants: SHENZHEN FUTAIHONG PRECISION INDUSTRY CO., LTD., Shenzhen (CN); FIH (Hong Kong) Limited, Kowloon (HK)

(72) Inventors: Jie Gao, Shenzhen (CN); Bing Yu, Shenzhen (CN); Jian-Ping Jin, Shenzhen (CN)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 238 days.

(21) Appl. No.: 13/967,439

(22) Filed: Aug. 15, 2013

(65) Prior Publication Data

US 2014/0237795 A1    Aug. 28, 2014

(30) Foreign Application Priority Data

Feb. 22, 2013    (CN) ........................ 2013 1 00566363

(51) Int. Cl.
*B23P 19/00* (2006.01)
*B23P 19/04* (2006.01)
*G06F 1/16* (2006.01)

(52) U.S. Cl.
CPC . *G06F 1/16* (2013.01); *B23P 19/04* (2013.01); *Y10T 29/49822* (2015.01); *Y10T 29/49824* (2015.01); *Y10T 29/53274* (2015.01); *Y10T 29/53283* (2015.01); *Y10T 29/53683* (2015.01)

(58) Field of Classification Search
CPC .................. Y10T 29/49815; Y10T 29/49821; Y10T 29/49822; Y10T 29/49824; Y10T 29/53274; Y10T 29/53283; Y10T 29/53683; Y10T 29/53796; B23P 19/04; B65G 47/907; B65G 47/918
See application file for complete search history.

(56) References Cited

U.S. PATENT DOCUMENTS

| | | | |
|---|---|---|---|
| 6,000,901 A * | 12/1999 | Fierkens | 414/416.09 |
| 7,464,807 B2 * | 12/2008 | Ham et al. | 198/468.3 |
| 7,469,457 B2 * | 12/2008 | Ishikawa et al. | 29/426.5 |
| 7,624,498 B2 * | 12/2009 | Ko et al. | 29/742 |
| 8,033,381 B2 * | 10/2011 | Konstandin et al. | 198/458 |
| 9,016,461 B2 * | 4/2015 | Yin et al. | 198/459.3 |
| 2003/0221312 A1* | 12/2003 | Lee | 29/762 |
| 2005/0274457 A1* | 12/2005 | Cheung et al. | 156/344 |
| 2006/0107513 A1* | 5/2006 | Ishikawa et al. | 29/426.5 |
| 2007/0293022 A1* | 12/2007 | Ko et al. | 438/464 |
| 2010/0037445 A1* | 2/2010 | Ko et al. | 29/426.6 |

* cited by examiner

*Primary Examiner* — Essama Omgba
(74) *Attorney, Agent, or Firm* — Novak Druce Connolly Bove + Quigg LLP

(57) ABSTRACT

A workpiece separating device for separating workpieces from support sheets includes a lifting unit and a positioning assembly supporting the support sheets with the workpieces adhered. The lifting unit includes a lifting cylinder and two pins raised and lowered by the lifting cylinder. The two pins are raised by the lifting cylinder to push the workpieces, thereby separating the workpieces from the support sheets in turn. A method for separating workpieces from support sheets using the present device is also provided.

14 Claims, 4 Drawing Sheets

WORKPIECE SEPARATING DEVICE

BACKGROUND

1. Technical Field

The present disclosure generally relates to devices for separating workpieces (e.g., foam) from support materials.

2. Description of Related Art

Foam is widely used in the manufacturing of electronic devices. Before being assembled, foam is adhered on support materials, such as paper boards. During assembly, the foam having a relatively large size, can be effectively separated from the support materials using vacuum grip devices. However, it is difficult to separate the foam with small sizes, 4.8 mm×4.8 mm for example, from support materials using vacuum grip devices alone.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
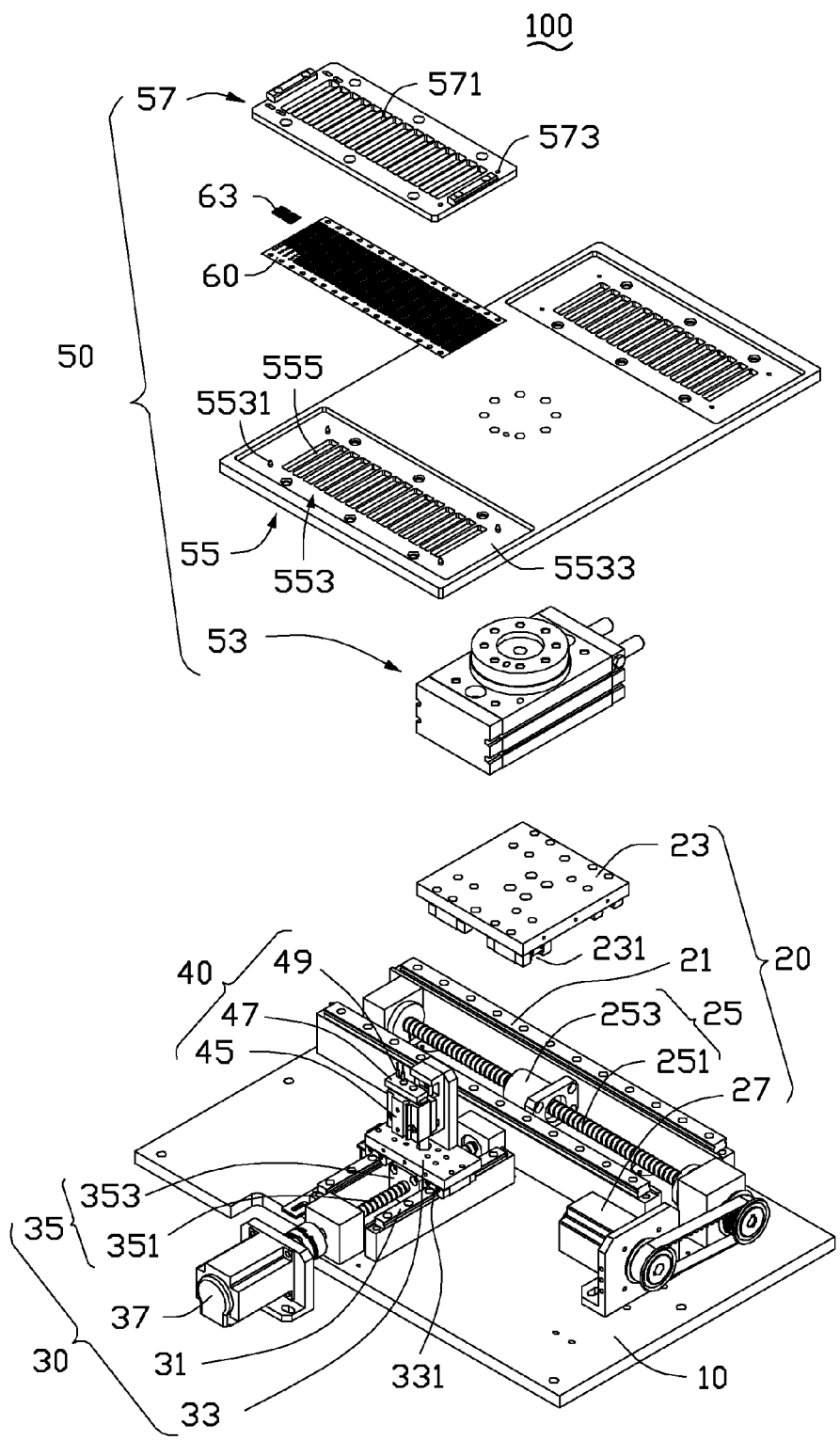
FIG. 1 is an exploded, isometric view of a workpiece separating device in accordance with an exemplary embodiment.
Figure 2:
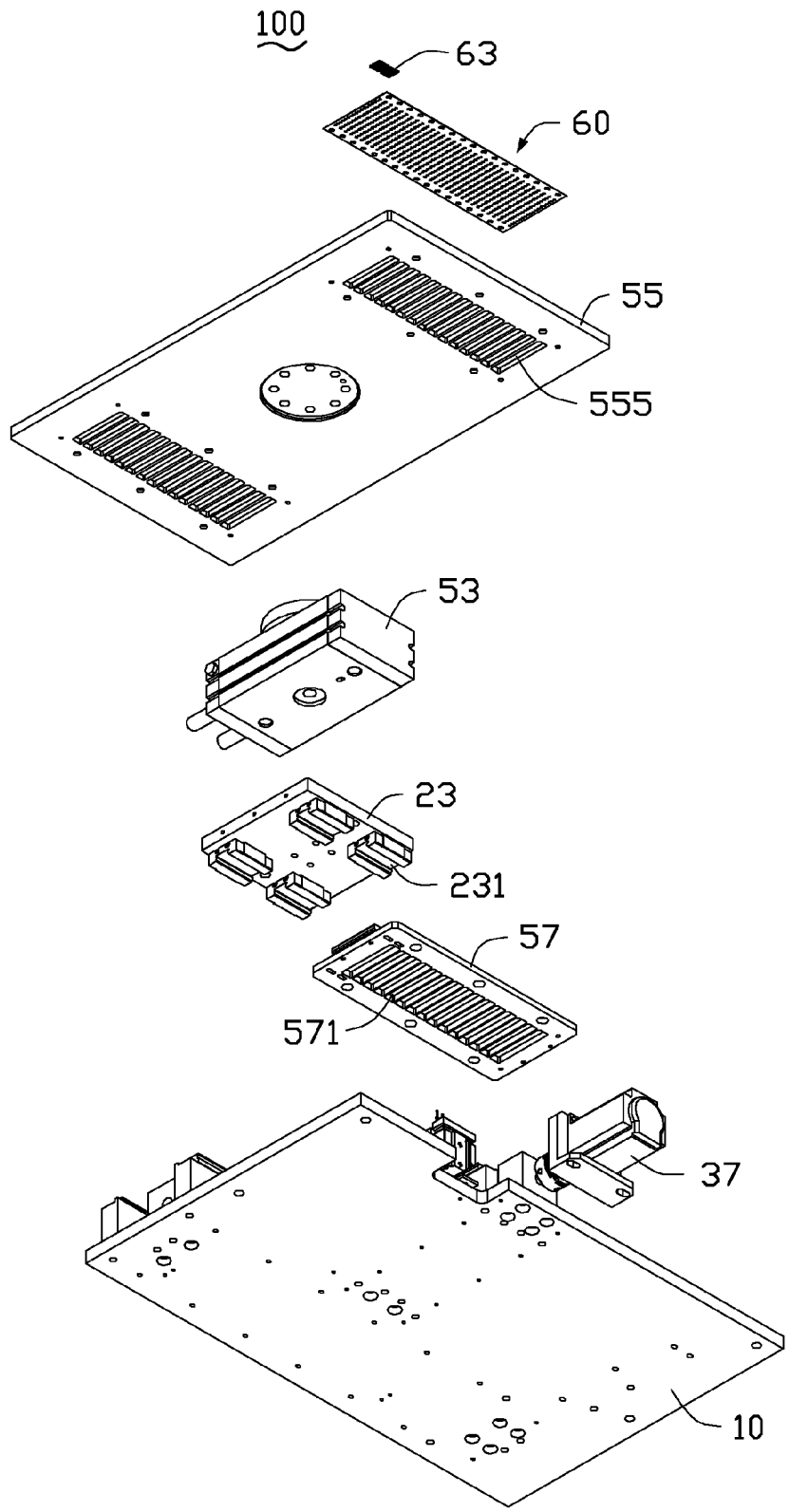
FIG. 2 is an exploded, isometric view of the workpiece separating device of FIG. 1 viewed from another angle.
Figure 3:
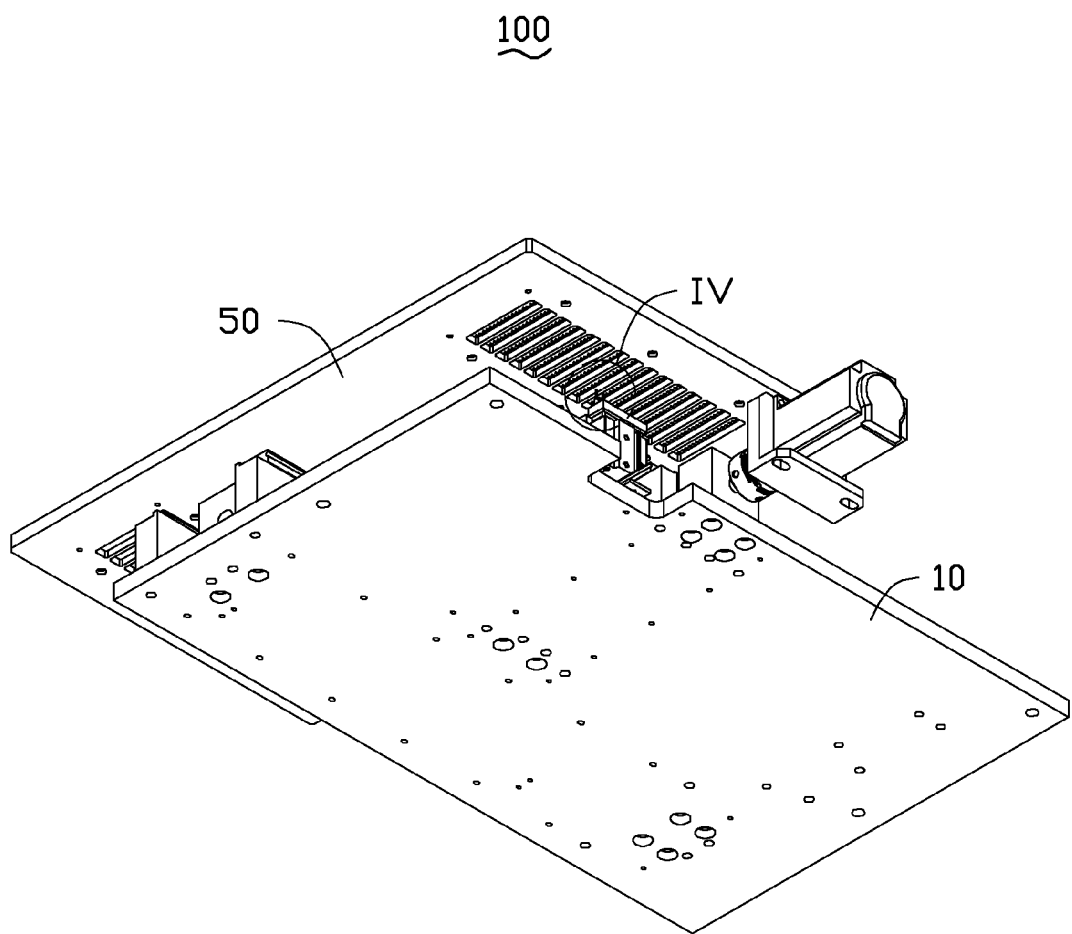
FIG. 3 is an assembled, isometric view of the workpiece separating device of FIG. 2.

FIGS. 1-3 show an exemplary embodiment of a workpiece separating device 100. The workpiece separating device 100 may be used for separating workpieces 63 from support sheets 60 where the workpieces 63 are adhered. Each of the support sheets 60 defines two through holes 612 (best shown in FIG. 4) corresponding to each workpiece 63. The workpieces 63 can be foam pieces or other elements of electronic devices. The workpiece separating device 100 includes an assembling board 10, a first driving unit 20, a second driving unit 30, a lifting unit 40, and a positioning assembly 50. The first and second driving units 20, 30 are assembled on the assembling board 10. The lifting unit 40 is slidably assembled to the second driving unit 30. The positioning assembly 50 is slidably assembled to the first driving unit 20. The support sheet 60 is positioned on the positioning assembly 50.

The first driving unit 20 includes two first sliding rails 21, a first sliding block 23, a first ball screw 25, and a first driving element 27. The two first sliding rails 21 are attached on the assembling board 10 and are substantially parallel to each other. The first sliding block 23 defines two sliding grooves 231 engaged with the two first sliding rails 21. The first ball screw 25 is positioned between the two first sliding rails 21 and includes a first threaded shaft 251 and a first nut 253 slidably coiled around the first threaded shaft 251. The sliding block 23 is attached to the first nut 253 and is capable of sliding relative to the first threaded shaft 251 and the two sliding rails 21. The first driving element 27 can be a motor and drives the first threaded shaft 251 of the first ball screw 25. When the first driving element 27 rotates the first threaded shaft 251, the first nut 253 slides along the first threaded shaft 251, thereby driving the sliding block 23 to slide along the two first sliding rails 21. A direction parallel to the two first sliding rails 21 is defined as a first direction.

The second driving unit 30 is positioned adjacent the first driving unit 20. The second driving unit 30 includes two second sliding rails 31, a second sliding block 33, a second ball screw 35, and a second driving element 37. The two second sliding rails 31 are attached on the assembling board 10 and are substantially parallel to each other. The two second sliding rails 31 are substantially perpendicular to the two first sliding rails 21. An end of the two second sliding rails 31 is adjacent to and aligned with a substantially middle portion of one of the two first sliding rails 21. The second sliding block 33 defines two sliding recesses 331 engaged with the two second sliding rails 31. The second ball screw 35 is positioned between the two second sliding rails 31 and includes a second threaded shaft 351 and a second nut 353 slidably coiled around the second threaded shaft 351. The second sliding block 33 is attached to the second nut 353 to be capable of sliding relative to the second threaded shaft 351 and the two first sliding rails 31. The second driving element 37 can be a motor and drives the second threaded shaft 351 of the second ball screw 35. When the second driving element 37 rotates the second threaded shaft 351, the second nut 353 slides along the second threaded shaft 351, thereby driving the second sliding block 33 to slide along the two second sliding rails 31. A direction parallel to the two second sliding rails 31 is defined as a second direction.

The lifting unit 40 includes a lifting cylinder 45, a support board 47, and two pins 49. The lifting cylinder 45 is attached on the second sliding block 33. The support board 47 is connected to the lifting cylinder 45 to be raised and lowered by the lifting cylinder 45. The two pins 49 are attached upright to the support board 47. When the support board 47 is driven by the lifting cylinder 45 to move up and down, the two pins 49 are raised and lowered by the support board 47. A moving direction of the pins 49 is substantially perpendicular to the first and second directions and is defined as a third direction.

The positioning assembly 50 includes a rotating cylinder 53, a rotating board 55, and two fixing plates 57. The rotating cylinder 53 is attached to the first sliding block 23. A center portion of a lower surface of the rotating board 55 is connected to the rotating cylinder 53 for rotation by the rotating cylinder 53. The rotating board 55 defines two positioning recesses 553 in an upper surface. The two positioning recesses 553 are located at opposite ends of the rotating board 55. Each positioning recess 553 is configured for receiving one support sheet 60 and one fixing plate 57. Each positioning recess 553 has a plurality of limiting posts 5531 protruding from a bottom 5533. The limiting posts 5531 are configured for limiting a position of the support sheets 60. Each positioning recess 553 further defines a plurality of slots 555 to allow the pins 49 to be inserted through to separate the workpieces 63 from the support sheets 60, by pushing the workpieces 63 via the through holes 612 of the support sheets 60. Each fixing plate 57 defines a plurality of latching holes 573 corresponding to the limiting posts 5531 and defines a plurality of openings 571 corresponding to the slots 555. The plurality of openings 571 are configured for a vacuum grip device attached on a robot (not shown) to take out the workpieces. When the support sheets 60 and the fixing plates 57 are received in the positioning recesses 553, each support sheet 60 is located between the rotating board 55 and the corresponding fixing plate 57 with the through holes 612 aligned with the slots 555. The limiting posts 5531 are inserted into the latching holes 573, thereby securing the support sheets 60 in the positioning recesses 553.

Figure 4:
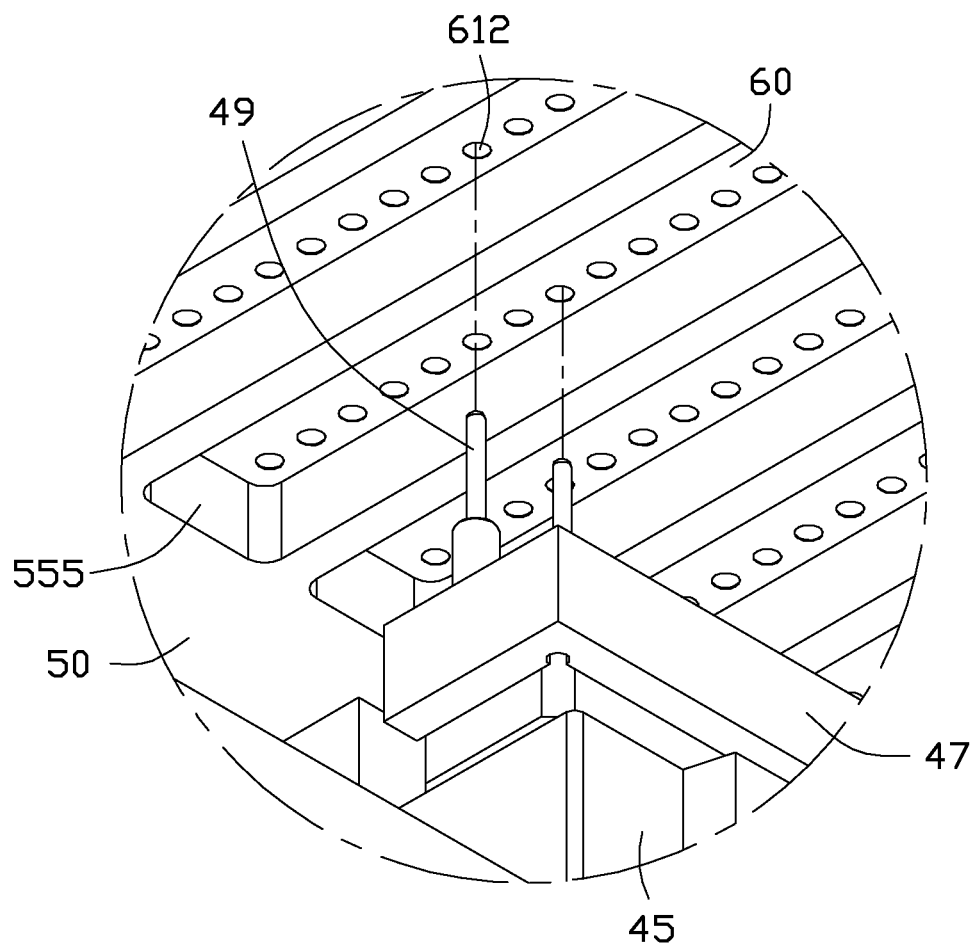
FIG. 4 is an enlarged view of circled portion IV of FIG. 3.

In use, referring to FIGS. 3 and 4, the first driving element 27 drives the first ball screw 25 to rotate. The first ball screw 25 drives the first sliding block 23 bringing with the positioning assembly 50 to move along the first direction. The second driving element 37 drives the second ball screw 35 to rotate. The second ball screw 35 drives the second sliding block 33, moving the lifting unit 40 along the second direction perpendicular to the first direction, and enabling the pins 49 to be aligned with two through holes 612 corresponding to a workpiece 63, as shown in FIG. 4. At this time, the vacuum grip device can be driven to be aligned with and in touch with the workpiece 63. Then, the two pins 49 are moved towards the workpiece 63 by the lifting cylinder 45 to be inserted through the corresponding slot 555 to separate the workpiece 63 from the support sheet 60, by pushing the workpiece 63 via the through holes 612 of the support sheet 60. The separated workpiece 63 can be taken by the vacuum grip device. Then, the first driving unit 20 and the second driving unit 30 adjust the positioning assembly 50 and the pins 49 again, enabling the pins 49 to be aligned with another two through holes 612 corresponding to another workpiece 63. The above steps are repeated until the workpieces 63 on the support sheet 60 positioned at one end of the rotating board 55. The rotating cylinder 53 then drives the rotating board 55 to rotate, positioning another support sheet 60 at another end of the rotating board 55 correctly to allow the workpieces 63 thereon to be separated.

In other embodiments, the lifting unit 40 can have more than two pins 49, multiples of two secured on the support board 47, for example. The lifting unit 40 can also have only one pin 49.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A workpiece separating device for separating workpieces from support sheets, the workpiece separating device comprising:
    a lifting unit comprising a lifting cylinder and two pins moved by the lifting cylinder; and
    a positioning assembly supporting the support sheets with the workpieces adhered;
    a first driving unit, the positioning assembly attached to the first driving unit; and
    a second driving unit, the lifting unit attached to the second driving unit;
    wherein the two pins are moved toward the one of the workpiece by the lifting cylinder to push the workpiece, thereby separating the workpieces from the support sheets;
    wherein the first driving unit drives the positioning assembly to move along a first direction perpendicular to a moving direction of the two pins, and the second driving unit drives the lifting unit to move along a second direction perpendicular to the first direction and the moving direction of the two pins, enabling the two pins to be aligned with the workpiece and separate the workpiece from the support sheets in turn.

2. The workpiece separating device as claimed in claim 1, wherein the positioning assembly comprises a rotating cylinder and a rotating board; the support sheets are positioned on the rotating board; the rotating cylinder rotates the rotating board, enabling the support sheets to be aligned with the two pins in turn.

3. The workpiece separating device as claimed in claim 2, wherein the rotating board defines two positioning recesses in opposite ends; each positioning recess receives one support sheet; each positioning recess defines a plurality of slots to allow the two pins to be inserted through to push the workpieces.

4. The workpiece separating device as claimed in claim 3, wherein the positioning assembly further comprises two fixing plates, each of the two fixing plates is secured in one positioning recess, thereby latching the support sheets in the positioning recesses.

5. The workpiece separating device as claimed in claim 4, wherein each fixing plate defines a plurality of openings corresponding to the slots.

6. The workpiece separating device as claimed in claim 2, wherein the first driving unit comprises a first sliding block, a first ball screw, and a first driving element; the first sliding block is attached on the first ball screw; the rotating cylinder is attached on the first sliding block; the first driving element drives the first ball screw, thereby driving the first sliding block bringing with the rotating cylinder to moving along the first direction.

7. The workpiece separating device as claimed in claim 6, wherein the second driving unit comprises a second sliding block, a second ball screw, and a second driving element; the second sliding block is attached on the second ball screw; the lifting cylinder is attached on the second sliding block; the second driving element drives the second ball screw, thereby driving the first sliding block bringing with the lifting cylinder to moving along the second direction.

8. A method for separating workpieces from support sheets, comprising:
    providing support sheets having workpieces adhered on a surface, the support sheets defining two through holes corresponding to each workpiece;
    providing a device, the device comprising:
        a lifting unit comprising a lifting cylinder and two pins moved by the lifting cylinder; and
        a positioning assembly supporting the support sheets with the workpieces adhered;
        a first driving unit, the positioning assembly attached to the first driving unit; and
        a second driving unit, the lifting unit attached to second driving unit;
    moving the two pins towards one of the workpiece by the lifting cylinder to push the workpiece through the through holes, thereby separating the workpieces from the support sheets;
    wherein the first driving unit drives the positioning assembly to move along a first direction perpendicular to a moving direction of the two pins, and the second driving unit drives the lifting unit to move along a second direction perpendicular to the first direction and the moving direction of the two pins, enabling the two pins to be aligned with one workpiece and separate the workpiece from the support sheets.

9. The method as claimed in claim 8, wherein the positioning assembly comprises a rotating cylinder and a rotating board; the support sheets are positioned on the rotating board; the rotating cylinder rotates the rotating board, enabling the support sheets to be aligned with the two pins in turn.

10. The method as claimed in claim 9, wherein the rotating board defines two positioning recesses in opposite ends; each positioning recess receives one support sheet; each positioning recess defines a plurality of slots to allow the two pins to be inserted through to push the workpieces via the through holes.

11. The method as claimed in claim 10, wherein the positioning assembly further comprises two fixing plates, each of the two fixing plates is secured in one positioning recess, thereby latching the support sheets in the positioning recesses.

12. The method as claimed in claim 11, wherein each fixing plate defines a plurality of openings corresponding to the slots.

13. The method as claimed in claim 9, wherein the first driving unit comprises a first sliding block, a first ball screw, and a first driving element; the first sliding block is attached on the first ball screw; the rotating cylinder is attached on the first sliding block; the first driving element drives the first ball screw, thereby driving the first sliding block bringing with the rotating cylinder to moving along the first direction.

14. The method claimed in claim 13, wherein the second driving unit comprises a second sliding block, a second ball screw, and a second driving element; the second sliding block is attached on the second ball screw; the lifting cylinder is attached on the second sliding block; the second driving element drives the second ball screw, thereby driving the first sliding block bringing with the lifting cylinder to moving along the second direction.

* * * * *